United States Patent Office 3,141,927
Patented July 21, 1964

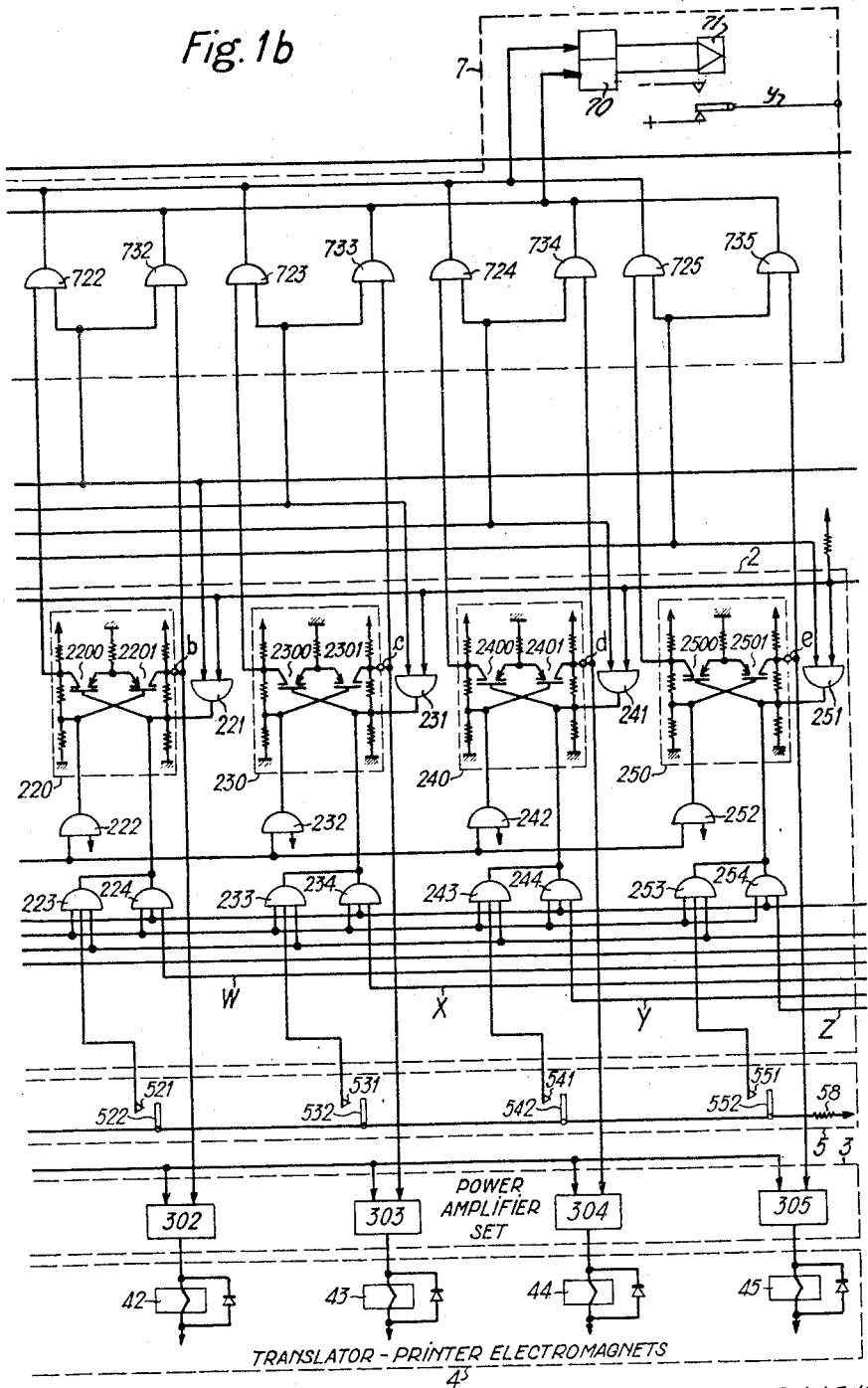

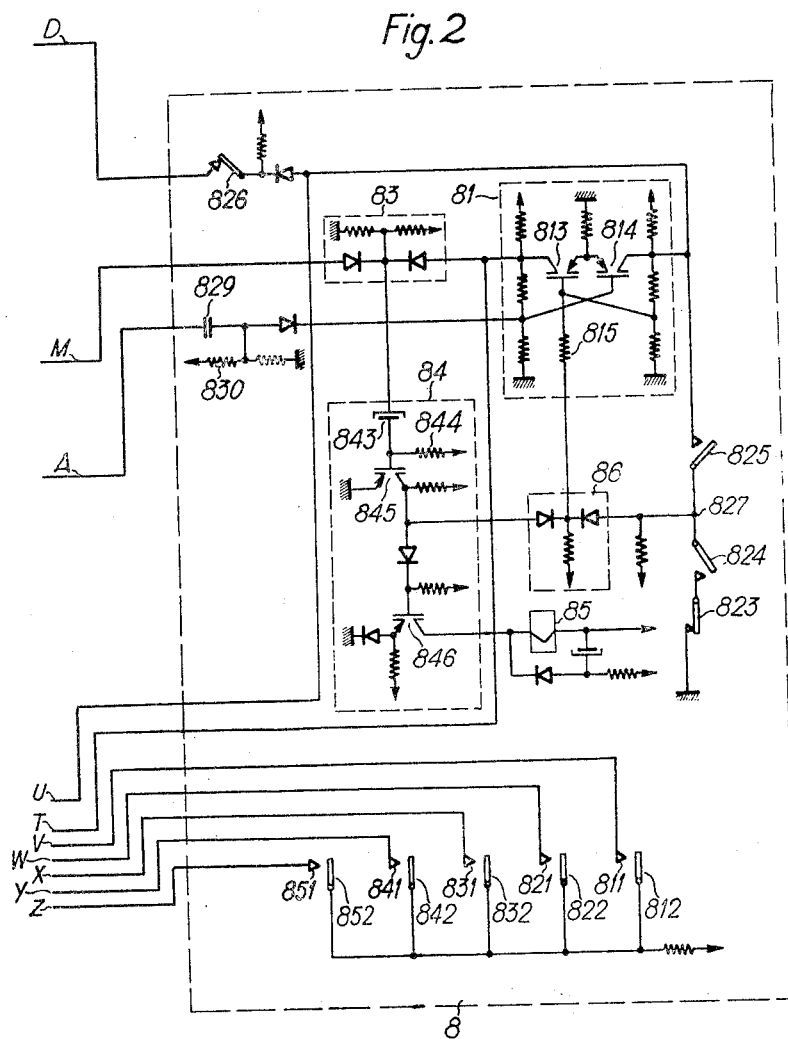

3,141,927
TAPE-READER ASSOCIATED WITH AN
ELECTRONIC TELEPRINTER
Roger P. Sourgens, 4 Ave. du Marechal Joffre, Bourg-la-
Reine, France, and Raymond A. Chollet, 5 Rue Besson,
Arcueil, Seine, France
Filed Oct. 27, 1961, Ser. No. 167,988
2 Claims. (Cl. 178—23)

The present invention concerns the combination of a tape-reader with an electronic teleprinter.

Electronic teleprinters are known which comprise a single memory device adapted for recording the code elements of the telegraphic characters received through a receiving channel, the code elements of the telegraphic characters transmitted by means of the teleprinter keyboard and the code elements of the telegraphic characters transmitted by means of the teleprinter answer-back unit and a single time-base for time-controlling the transfer of the code elements to and from the memory device.

The object of the invention is to combine a tape-reader with an electronic teleprinter of the kind above referred to.

The teleprinters of the above-mentioned kind have a plurality of access gates respectively controlling the paths from the keyboard transmitter, the answer-back unit and the reception relay to the memory.

In the arrangement of the invention, between a tape-reader and a teleprinter, the time-base of the teleprinter is initiated by a push-on button of the tape-reader through means sensitive to the tensile force of the tape, whereby the time-base is stopped when the tape is too much stretched, and the advance of the tape-reader is controlled by the time-base. Furthermore means are provided for inhibiting the memory access gates from the keyboard transmitter when the tape-reader operates and for inhibiting the tape-reader when the teleprinter is in the receiving condition or in the answer-back unit transmission condition.

The novel features that are considered characteristic of the invention are set forth with particularity in the appended claims. The invention itself, both as to its organisation and method of operation, as well as additional objects and advantages thereof will best be understood from the following description when read in connection with the accompanying drawings in which:

FIGS. 1a and 1b represent in detailed diagrammatic form the teleprinter; and

FIG. 2 represents the tape-reader.

Figure 1A:
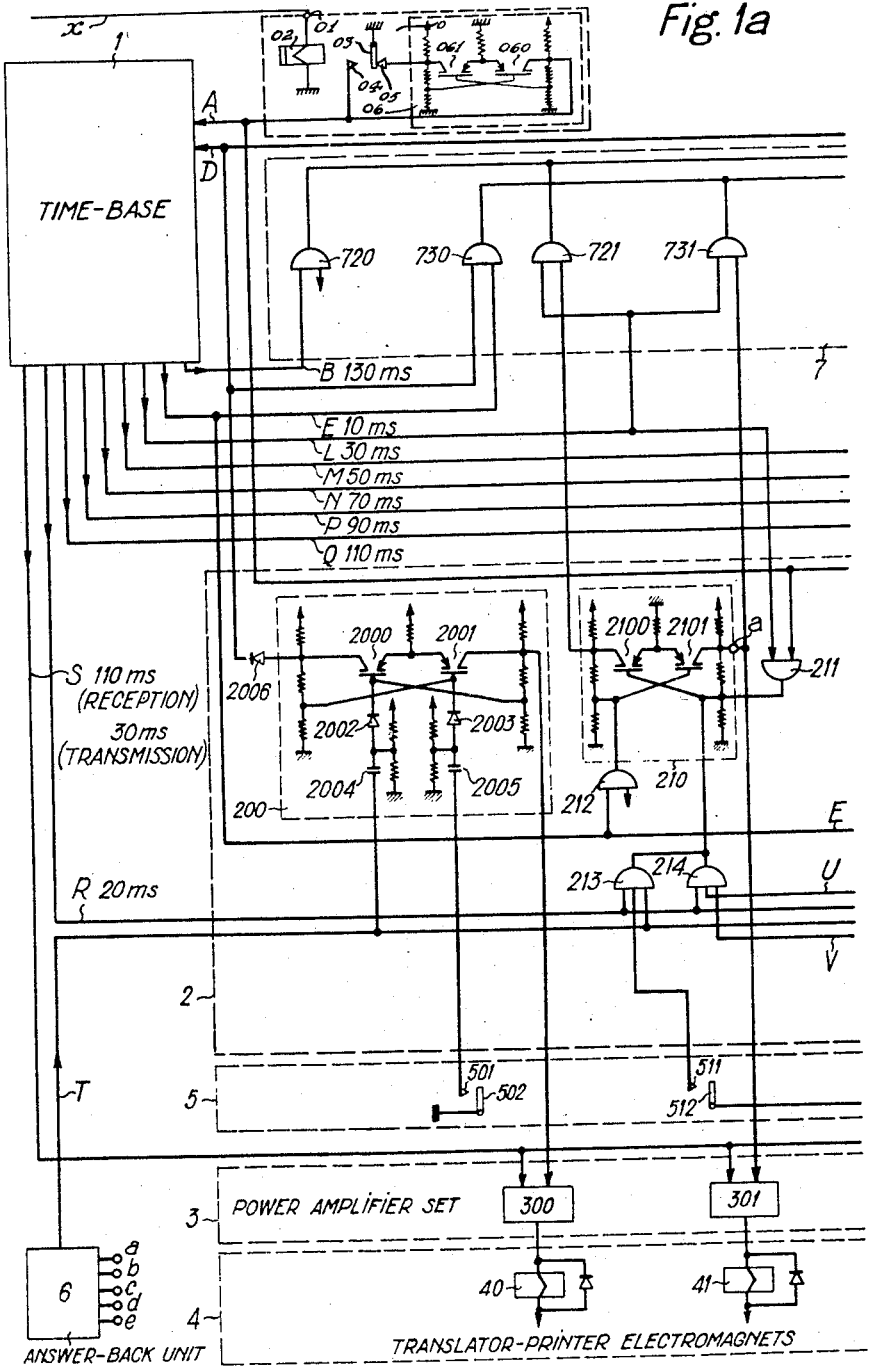

The teleprinter comprises the following units:

A—Reception device 0;
B—Time-base 1;
C—Memory device 2;
D—Answer-back unit 6;
E—Translator-printer 4;
F—Control device of the translator-printer 3;
G—Keyboard transmitter 5;
H—Transmission modulator 7.

Only unit 2 which is new will be described in detail. Units 0, 1, 3, 4, 5, 6 and 7 are known in the prior art and are described either in U.S. Patent 2,897,258 or in our copending application Ser. No. 128,115, filed July 31, 1961, now U.S. Patent No. 3,099,905, issued July 30, 1963.

It will be assumed by way of example in the following description that the telegraphic cycle is of 150 milliseconds.

A—RECEPTION DEVICE

The reception device shown in FIG. 1a constitutes unit 0 and includes: an input terminal 01 connected to a telegraphic reception channel $x$, a telegraphic relay 02 associated with a bistable trigger 06 comprising two transistors 060 and 061. Relay 02 establishes either contact 05 if a spacing element is applied to terminal 01, or contact 04 if a marking element is applied to this same terminal. Contacts 04 and 05 being respectively connected to the collectors of transistors 060 and 061 of trigger 06, trigger 06 is positioned according to the state of the reception channel. Transistor 061 is conductive and transistor 060 is blocked when the reception channel receives a spacing element. The collector of transistor 061 is then at a voltage somewhere near zero. If, on the contrary, the channel receives a marking element, this same collector is brought to a negative voltage.

When the reception device receives a start element, a ground voltage is applied to lead A and it will be seen that this voltage has the effect of starting time-base 1.

B—TIME-BASE

The time-base 1 produces timing pulses respectively at 10, 30, 50, 70, 90, 110, 130 milliseconds of each telegraphic cycle on outgoing lines E, L, M, N, P, Q and B and at 20 milliseconds on outgoing line R. It also produces a timing pulse on outgoing line S which occurs at 30 or 110 milliseconds according to whether the actual cycle of the time-base is a transmission or a reception cycle.

The time-base is initiated through ingoing line A as regards the reception cycles and through ingoing line D as regards the transmission cycle.

A time-base such as 1 of FIG. 1a is fully disclosed in our copending application above referred to, the reference letters of the ingoing and outgoing lines being the same in said copending application and in the present one.

C—MEMORY DEVICE

The memory device 2 is represented in FIGS. 1a and 1b and comprises:

A trigger 200 controlled by the trip bar of the teleprinter;

Five memory transistor triggers 210, 220, 230, 240, 250. Each trigger comprises two transistors, respectively 2100 and 2101 for trigger 210, 2200 and 2201 for trigger 220, 2300 and 2301 for trigger 230, 2400 and 2401 for trigger 240, 2500 and 2501 for trigger 250. The collectors of the right-hand transistor of the memory triggers are respectively connected to terminals $a$, $b$, $c$, $d$, $e$ of the answer-back unit;

Five gates of access to the memory devices from the reception device 0, respectively 211, 221, 231, 241 and 251. These gates are all connected to lead A and respectively to timing leads L, M, N, P, Q and the outputs are connected respectively to the memory triggers;

Five gates of access to the memory device from the code bars of the keyboard transmistter 5, respectively 213, 223, 233, 243, 253. The inputs of said gates are all connected to leads R and T and respectively to the contacts 511, 521, 531, 541, 551 of the code bars and the outputs are connected respectively to the memory triggers;

Five gates of access to the memory device from the code feelers of the tape-reader 8, respectively 214, 224, 234, 244, 254. The inputs of said gates are all connected to leads R and U and respectively to the code contacts 811, 821, 831, 841, 851 of the tape reader through connection leads V, W, X, Y, Z;

Five gates of reset 212, 222, 232, 242, 252. The inputs of said gates are all connected to lead E and to a source of reset potential.

The reset operation controlled through lead E occurs at the instant 10 milliseconds of the cycle.

The record of the series code elements of a character received is controlled through lead L for the first code element, lead M for the second, lead N for the third, lead P for the fourth and lead Q for the fifth. Thus the code elements are respectively recorded in the memory device at the instants 30, 50, 70, 90, 110 milliseconds of the cycle.

The transfer into the memory device of the code elements of a character transmitted by the keyboard transmitter or by the tape-reader is controlled through lead R and occurs at the instant 20 milliseconds of the cycle. At the same instant, trigger 200 which is a trigger characterizing the transmission condition is reset also through lead R.

The operation of a key of the keyboard transmitter involves:

(a) A beat of armature 502 controlled by the trip-bar of the teleprinter, which establishes the work contact 501 and then reverts to its initial state.

(b) The positioning of armatures 512, 522, 532, 542, 552 controlled by the code bars of the teleprinter which either establish or do not establish a connection with contacts 511, 521, 531, 541, 551 according to whether the code element is a marking or a spacing element. It should be noted that the positioning of armatures 512, 522, 532, 542, 552 remains unchanged until the operator operates another key of the keyboard.

The establishment of contact 501 causes the application of a ground potential to capacitor 2005. The latter then produces a positive pulse which, transmitted through diode 2003, is applied to the base of transistor 2001 which becomes nonconducting. Trigger 200 is thus brought in the state "one." Transistor 2000 becomes conducting and the potential of its collector gets near to ground potential. This potential change is transmitted through diode 2006 and connection lead D and is applied to the time-base as an initiating signal.

D—ANSWER-BACK DEVICE

The answer-back device is represented by the block 6 in FIG. 1a. It is known per se. It comprises five code terminals a, b, c, d, e which are respectively connected to the collectors of the right hand transistors of memory triggers 210, 220, 230, 240, 250 and an outgoing lead T which is brought to a characteristic potential when the answer-back device is operative. As will be seen later, lead T has two objects: controlling the opening of the access gates from the keyboard transmitter to the memory and stopping the tape-reader when the answer-back unit operates.

E—TRANSLATOR-PRINTER

The electromagnet set of the translator-printer is of a conventional type disclosed in chapter H of U.S. Patent 2,897,258. It comprises five code electromagnets 41 to 45 intended to control the positioning of the translator-printer code bars and an initiating electromagnet 40 intended to initiate the translator-printer mechanical cycle.

F—POWER AMPLIFIER SET

The power supply amplifier set for the translator-printer is of known type disclosed in chapter G of U.S. Patent 2,897,258. It comprises an amplifier 300 for controlling electromagnet 40 and five amplifiers 301 to 305 combined with AND gates for the control of the code electromagnets 41 to 45. The amplifiers 300 to 305 are placed under the dual control of the corresponding trigger of the memory device 2, respectively 200, 210, 220, 230, 240, 250 and of the time-base 1 which applies to connection lead S a signal occurring at 110 milliseconds during the reception cycles and at 30 milliseconds during the transmission cycles.

G—KEYBOARD TRANSMITTER

The keyboard transmitter is of a conventional type. It comprises keys, a trip bar and five code bars not represented and a general contact (501–502) controlled by the trip bar and five code contacts (511–512), (521–522), (531–532), (541–542), (551–552) controlled by the code bars. The mobile contacts 512, 522, 532, 542, 552 are connected to the negative terminal of the battery through resistor 58.

H—TRANSMISSION MODULATOR

The transmission modulator is essentially made up of transmission trigger 70 associated with telegraphic relay 71, and two groups of six gates 720 to 725, 730 to 735, the first gate of each group corresponding to the start element and the five last gates corresponding to the code elements.

The two gates relative to a given code element, gates 721 and 731 relative to the first code element for example, have their inputs connected respectively to the collectors of the left hand and right hand transistors of trigger 210 relative to said element on the one hand and together to lead L on the other hand. Thus if the first code element is a marking element, it is allowed to pass through open gate 731 at the instant 30 milliseconds of the cycle and it brings trigger 70 into its "one" condition and relay 71 into its marking condition. If, on the contrary, the first element is a spacing element, it would pass through open gate 721 at the same instant and would bring trigger 70 into its "zero" condition and relay 71 into its spacing condition.

Gate 720 is intended to pass the stop element and gate 730 the start element.

I—TAPE-READER

The tape-reader 3 associated with the teleprinter is represented in FIG. 2. It comprises essentially code contacts 811–812, 821–822, 831–832, 841–842, 851–852 which are shown in FIG. 2 in the form of relay contacts but which are in fact feelers exploring the perforations of the tape, a trigger 81 the state of which characterizes the operative or non-operative condition of the tape-reader, a tape advancing relay 85, an amplifier 84 and means for switching the trigger 81.

The collectors of the two transistors constituting trigger 81 are connected to leads T and U above referred to which respectively control the transfer gates from the keyboard transmitter to the memory and the transfer gates from the tape-reader to the memory. Consequently whenever a gating potential is applied to one lead, an inhibiting potential is applied to the other.

At rest (zero condition), i.e. when the tape-reader is in the non-operative condition, transistor 813 of trigger 81 is conductive and transistor 814 is blocked. A ground potential is applied to lead T whereby gates 213, 223, 233, 243, 253 are open and a negative potential is applied to lead U whereby gates 214, 224, 234, 244, 254 are closed. When a timing pulse comes through lead R at the instant 20 milliseconds of the cycle, the code elements of the keyboard transmitter are transferred into the memory.

Should trigger 81 be in the one condition, it is the code elements of the tape-reader which would have been transferred into the memory.

Trigger 81 may be positioned in several ways.

First, during the operation of the answer-back unit, lead T is brought to a ground potential by said unit. Thus the collector of transistor 813 is at ground potential and trigger 81 is in its zero condition. It results that during the operation of the answer-back unit, transmission by the tape-reader is cut-off. As the code terminals of answer-back unit 6 are directly connected to the collectors of transistors 2101, 2201, 2301, 2401, 2501, the memory triggers are positioned by said unit and are insensitive to the keyboard transmitter.

Trigger 81 may be brought to its one condition through normally closed contact 823 and contacts 824 and 825. Contact 824 is a contact sensitive to the engagement of the tape and which releases when the tape is terminated and contact 825 is the contact of the push-on button of the tape-reader.

When, a tape being engaged into the tape-reader, contact 825 is closed, a ground potential is applied to the collector of transistor 814 and trigger 81 takes its one condition. A ground potential is also applied to lead D through contact 826 which is sensitive to the tensile force undergone by the tape. When the tape tightens too much, contact 826 opens. As has been explained above, a ground potential on lead D initiates time-base 1. Timing signals are applied to lead M at the instant 50 milliseconds of each cycle; they pass through OR gate 83, are amplified by transistors 845 and 846 of amplifier 84 and drive step by step electromotor 85 (it has been assumed that the timing signals are transition steps between a zero and non-zero potential which are differentiated by capacitor 843 and resistor 844 in order to obtain pulses derived therefrom). The tape thus advances step by step and the code elements read by the feelers of the tape-reader are transferred at the instant 20 milliseconds of each cycle into the memory.

When the condition of the teleprinter changes from transmission to reception, a start element is applied to lead A and the front step of said element is differentiated by capacitor 829 and resistor 830. The resulting positive pulse is applied to the base of transistor 814 and trigger 81 is brought into its zero condition.

When the tape is too much tightened, contact 826 opens, the time-base stops and timing pulses are no more sent to the tape-reader; when the tape again loosens, advance of the tape is restored.

When the tape is terminated, contact 824 opens. As the push-on button of the tape-reader has been released after starting, contact 825 is open. The ground potential at point 827 is removed and the ground potential on the base of transistor 813 is only given by normally conductive transistor 845 through OR gate 86. In fact, a negative potential is applied to the base of transistor 845 through OR gate 83 when the tape-reader is operative, i.e. when transistor 813 is blocked and thus transistor 845 is conductive. When a positive advance pulse is applied to the base of transistor 845, said transistor is blocked and its collector becomes negative. The base of 813 is then brought to a negative potential; transistor 813 becomes conductive and thus the tape-reader is rendered inoperative. The same operation takes place when the tape-reader is manually stopped by means of contact 823.

Summing up, tape-reader 8 may be operated by means of contact 825 and stopped (i) in the case of a tensile force applied to the tape, (ii) in the case of reception of the teleprinter, (iii) in the case of operation of the answer-back unit, (iv) in the case of termination of the tape, (v) manually

What we claim is:

1. In a teleprinter set adapted for manual transmission and automatic data transmission, the combination of a tape-reader with an electronic teleprinter comprising a reception device, a single memory device, an answer-back unit, a time-base, a keyboard transmitter, a tape-reader, means controlled by said keyboard transmitter and said tape-reader for initiating said time-base, first means for transferring into said memory device code elements received by the reception device, second means for transferring into said memory device code elements generated by the answer-back unit, third means for transferring into said memory device code elements generated by the keyboard transmitter, fourth means for transferring into said memory device code elements generated by the tape-reader, said four transferring means being controlled by the time-base, means controlled by said first and second transferring means for inhibiting said fourth transferring means when the reception device and the answer-back unit are operative and means controlled by said fourth transferring means for inhibiting said third transferring means when the tape-reader is operative.

2. In a teleprinter set adapted for manual transmission and automatic data transmission, the combination of a tape-reader with an electronic teleprinter comprising a reception device, a single memory device, an answer-back unit, a time-base, a keyboard transmitter, a tape-reader including a contact sensitive to the tensile force undergone by the tape, means controlled by said keyboard transmitter for initiating said time-base, means controlled by said tape-reader through said contact for initiating said time-base, first means for transferring into said memory device code elements received by the reception device, second means for transferring into said memory device code elements generated by the answer-back unit, third means for transferring into said memory device code elements generated by the keyboard transmitter, fourth means for transferring into said memory device code elements generated by the tape-reader, said four transferring means being controlled by the time-base, means controlled by said first and second transferring means for inhibiting said fourth transferring means when the reception device and the answer-back unit are operative and means controlled by said fourth transferring means for inhibiting said third transferring means when the tape-reader is operative.

References Cited in the file of this patent
UNITED STATES PATENTS

| | | |
|---|---|---|
| 2,995,729 | Steele | Aug. 8, 1961 |
| 3,029,414 | Schrimpf | Apr. 10, 1962 |